United States Patent
Nokbak Nyembe et al.

(10) Patent No.: US 11,416,740 B2
(45) Date of Patent: Aug. 16, 2022

(54) ARTIFICIAL INTELLIGENCE OPTIMIZED TELECOMMUNICATIONS SYSTEMS

(71) Applicant: ADTRAN, Inc., Huntsville, AL (US)

(72) Inventors: Armand Nokbak Nyembe, Huntsville, AL (US); Sheila Knight, Huntsville, AL (US); Michael Arnold, Huntsville, AL (US); Ramya Raghavendra, Huntsville, AL (US); Jeremy Lyon, Huntsville, AL (US); Venkata Mallikarjunarao Kosuri, Huntsville, AL (US); Zack Whaley, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 1121 days.

(21) Appl. No.: 15/952,887

(22) Filed: Apr. 13, 2018

(65) Prior Publication Data

US 2019/0318238 A1 Oct. 17, 2019

(51) Int. Cl.
*G06N 3/08* (2006.01)
*G06F 40/30* (2020.01)
*G10L 15/16* (2006.01)
*G10L 15/18* (2013.01)
*G10L 15/22* (2006.01)

(52) U.S. Cl.
CPC ............... *G06N 3/08* (2013.01); *G06F 40/30* (2020.01); *G10L 15/16* (2013.01); *G10L 15/1815* (2013.01); *G10L 15/22* (2013.01)

(58) Field of Classification Search
CPC ....... G06N 3/08; G06F 40/30; H04L 65/1096; G10L 15/063; G10L 15/16
See application file for complete search history.

(56) References Cited

U.S. PATENT DOCUMENTS

| 2012/0005148 | A1 | 1/2012 | Horvitz et al. |
| 2017/0140041 | A1* | 5/2017 | Dotan-Cohen ....... H04W 4/021 |
| 2017/0279906 | A1* | 9/2017 | Laird-McConnell ... H04L 51/02 |

(Continued)

OTHER PUBLICATIONS

Su et al., "Continuously Learning Neural Dialogue Management", Jun. 8, 2016, arXiv:1606.02689v1, pp. 1-6. (Year: 2016).*

(Continued)

*Primary Examiner* — Ying Yu Chen
(74) *Attorney, Agent, or Firm* — Fish & Richardson P.C.

(57) ABSTRACT

Methods, systems, and apparatus, including computer programs encoded on a computer storage medium, for an artificial intelligence system. In one aspect, a system includes multiple artificial intelligence skill agents that have each been trained to perform different actions in a telecommunications system. The system also includes an orchestrator agent that interacts with each of the artificial intelligence skill agents and coordinates which of the artificial intelligence agents performs actions in response to user inputs. The orchestrator agent receives a user input and determines an intent expressed by the user input. The orchestrator agent transmits an instruction to an artificial intelligence skill agent to perform an action that provides a response to the intent. In response to receiving the instruction from the orchestrator agent, the artificial intelligence skill agent performs the action when the artificial intelligence skill agent is capable of carrying out the action.

20 Claims, 4 Drawing Sheets

(56) References Cited

U.S. PATENT DOCUMENTS

| | | |
|---|---|---|
| 2018/0053233 A1 | 2/2018 | Srivastava |
| 2018/0054464 A1* | 2/2018 | Zhang ................. H04L 65/1096 |
| 2018/0060301 A1* | 3/2018 | Li ............................ G06N 3/08 |
| 2019/0115027 A1* | 4/2019 | Shah ....................... G10L 17/22 |
| 2019/0139537 A1* | 5/2019 | Akamine .............. G10L 15/063 |

OTHER PUBLICATIONS

Liu et al., "Deep Contextual Language Understanding in Spoken Dialogue Systems", Sep. 2015, Microsoft Research/ISCA—International Speech Communication Association, pp. 1-5. (Year: 2015).*

Duggan et al., "A reinforcement learning approach for the scheduling of live migration from under utilised hosts", Dec. 9, 2016, Memetic Comp. (2017) 9, pp. 283-293. (Year: 2016).*

Extended European Search Report in EP Appln. No. 19168206.1 dated Aug. 22, 2019, 13 pages.

Netflix Technology Blog "Recommending for the World—Netflix TechBlog—Medium," Feb. 17, 2016, retrieved on Aug. 13, 2019, retrieved from URL<https://medium.com/netfliz-techblog/recommending-for-the-world-8da8cbcf051b>, 7 pages.

Communication in EP Appln. No. 19168206.1, dated Nov. 17, 2021, 13 pages.

McCamish et al., "A Signaling Game Approach to Databases Querying and Interaction," arXiv:1603.04068v5, May 2018, 21 pages.

\* cited by examiner

ARTIFICIAL INTELLIGENCE OPTIMIZED TELECOMMUNICATIONS SYSTEMS

BACKGROUND

This specification relates to processing data using artificial intelligence systems including machine learning models to optimize telecommunications systems.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes an artificial intelligence system implemented as computer programs on one or more computers in one or more locations that performs actions to optimize a telecommunications system. As used herein, the term "optimize" is used to refer to improvements over prior art systems, and should not be interpreted as a single optimum result.

According to a first aspect there is provided an artificial intelligence system including multiple artificial intelligence skill agents that have each been trained to perform different actions in a telecommunications system. The artificial intelligence system also includes an orchestrator agent that interacts with each of the artificial intelligence skill agents and coordinates which of the artificial intelligence agents performs actions in response to user input.

The orchestrator agent receives a user interface input that was input through a user interface, and determines an intent expressed by the user interface input. The orchestrator agent identifies, from among the artificial intelligence skills agents, a given artificial intelligence skill agent that has been trained to perform an action that provides a response to the intent expressed by the user interface input. The orchestrator agent transmits an instruction to the given artificial intelligence skill agent to perform the action.

In response to receiving the instruction from the orchestrator agent, the given artificial intelligence skill agent performs the action when the given artificial intelligence skill agent is capable of carrying out the action. When the given artificial intelligence skill agent is incapable of carrying out the action, the given artificial intelligence skill agent responds to the orchestrator agent with negative feedback.

In some implementations, determining an intent expressed by the user interface input includes providing an input based on the user interface input to an intent mapping neural network. The intent mapping neural network has a plurality of intent mapping neural network parameters, and is configured to process the input in accordance with the intent mapping neural network parameters to generate an intent mapping output. The system determines an intent based on the intent mapping output.

In some implementations, the orchestrator agent receives a reward based on progress towards results that respond to the user interface input. The intent mapping neural network is trained based on the reward using reinforcement learning techniques, including adjusting current values of the intent mapping neural network parameters.

In some implementations, determining an intent expressed by the user interface input includes processing the user interface input using natural language processing techniques.

In some implementations, when the given artificial intelligence skill agent is incapable of carrying out the action, the given artificial intelligence skill agent determines a new action (different than the initial action) that provides a response to the intent. The given artificial intelligence skill agent performs the new action when the given artificial intelligence skill agent is capable of carrying out the new action.

In some implementations, the system determines whether a multi-tiered access control condition has been met prior to the given artificial intelligence skill agent performing the action. More specifically, the system determines whether a network operator that submitted the user input has permission to access the given artificial intelligence skill agent, and whether the given artificial intelligence skill agent has permission to access data required to perform the action.

In some implementations, the given artificial intelligence skill agent performs the action conditional on the multi-tiered access control condition being met.

In some implementations, the given artificial intelligence skill agent performs the action when the multi-tiered access control condition has been met, and responds to the user input without performing the action when the multi-tiered access control condition has not been met.

According to a second aspect there is provided a computer-implemented method for performing operations including the operations of the artificial intelligence system.

According to a third aspect there is provided a non-transitory computer storage medium storing instructions executable by a data processing apparatus and that upon such execution cause the data processing apparatus to perform operations including the operations of the artificial intelligence system.

Particular embodiments of the subject matter described in this specification can be implemented so as to realize one or more of the following advantages.

The system as described in this specification integrates multiple skill agents, each of which are specialized to perform different actions (e.g., telecommunications system troubleshooting actions, or any other appropriate actions in a telecommunications system). Therefore, the skill agents are less likely to experience "catastrophic forgetting" during training than would be the case if the skill agents were not specialized, i.e., if the skill agents were trained to perform a large number of different actions. "Catastrophic forgetting" refers to a phenomenon where an artificial intelligence agent that is trained to perform a large number of different actions experiences degraded performance for previously learned actions as new actions are learned. Some conventional systems include artificial intelligence agents that are trained to perform large numbers of different actions, and are therefore more likely to experience catastrophic forgetting. Therefore, the system as described in this specification may perform actions that more effectively fulfill the intents expressed by user inputs than these conventional systems, since the system as described in this specification is less likely to experience catastrophic forgetting.

The system as described in this specification provides an effective integration pathway to deploy new skill agents alongside previously developed (e.g., trained) skill agents. Specifically, the system includes an orchestrator agent that can adaptively learn (e.g., by reinforcement learning techniques) how to distribute instructions to perform actions amongst the new skill agents and the previously developed skill agents to effectively fulfill the intents expressed by user inputs. In contrast, some conventional systems lack an effective integration pathway to deploy new skill agents alongside previously developed skill agents. For example, in some conventional systems, new skill agents would simply replace previously developed skill agents. Therefore, the system as described in this specification may perform actions that more effectively fulfill the intents expressed by user inputs than these conventional systems by deploying new skill agents alongside previously developed skill agents.

The system as described in this specification can process natural language (e.g., textual or spoken) inputs. For example, a user can directly ask the system: "how many new subscribers were added to the network this month?," and the system will respond with the number of new subscribers for the month. Therefore, despite the complexity of telecommunications systems, the system as described in this specification may usable even by inexperienced users, thereby improving access to information. In contrast, some conventional systems require users to provide inputs through a command line interface (which requires knowledge of command line syntax) or through a graphical user interface (which requires knowledge of how to navigate through the graphical user interface), and therefore may be unusable by inexperienced users. The present system provides more direct access to information with less input, thereby improving the user experience and ensuring that a user obtains the information they are seeking without having to access multiple different user interfaces or input specific command line syntax that might otherwise be required.

The system as described in this specification can determine whether to perform actions based on whether a multi-tiered access control condition has been met. The system can thereby ensure that both a user and a skill agent have permission to perform an action before the action is performed. Therefore, in contrast to some conventional systems, which lack multi-tiered access control, the system as described in this specification can, for example, prevent skill agents from performing actions that may disrupt the telecommunications system, or prevent unauthorized users from accessing confidential data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification discloses methods, systems, apparatus, and computer readable media for an artificial intelligence system that performs actions in a telecommunications system.

The artificial intelligence system includes an orchestrator agent that interacts with multiple artificial intelligence skill agents and coordinates which of the artificial intelligence skill agents performs actions (e.g., in response to user inputs). Examples of actions include troubleshooting the telecommunications system (e.g., detecting and resolving problems affecting the telecommunications system), providing information about the telecommunications system (e.g., providing information indicating current performance measures of the telecommunications system), optimizing traffic flow in the telecommunications system (e.g., by rerouting traffic to avoid bottlenecks), predicting telecommunications system failures (e.g., hardware failures), and deploying hardware and/or software into the telecommunications system (e.g., updating telecommunications system software by integrating a software patch).

As will be described in more detail below, the orchestrator agent receives an input (e.g., a textual or spoken command from a user through a user interface), determines an intent expressed by the input (e.g., an intent to troubleshoot the telecommunications system), identifies a skill agent that has been trained to perform an action that fulfills that specific intent (e.g., a skill agent that has been trained to perform troubleshooting actions), and transmits an instruction to the skill agent to fulfill the intent. In response to receiving the instruction from the orchestrator agent, the skill agent performs an action to fulfill the intent when it is capable of carrying out the action, and responds to the orchestrator agent with negative feedback when it is incapable of carrying out the action (e.g., because of a hardware or software failure).

Figure 1:
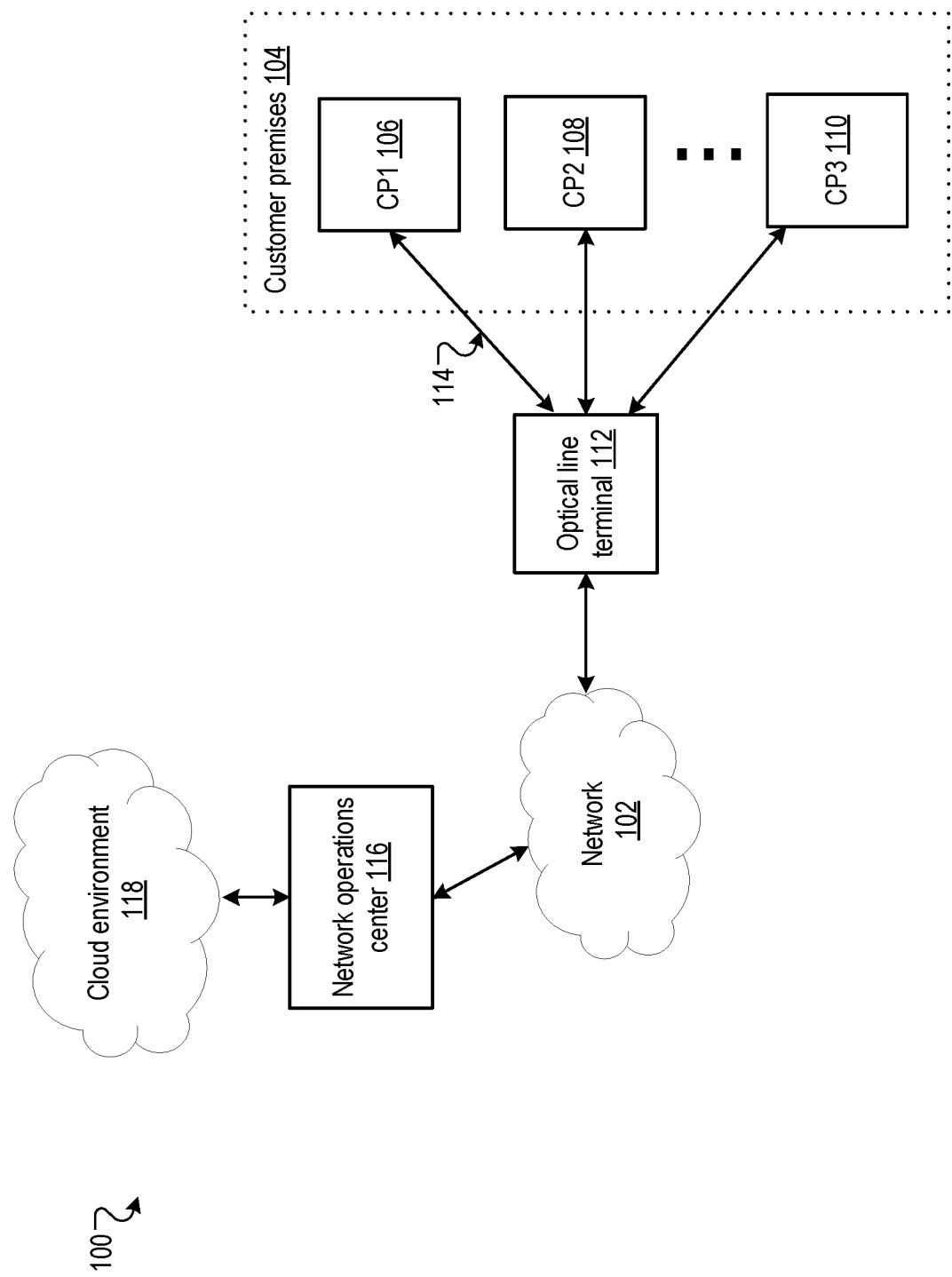
FIG. 1 is a block diagram of an example telecommunications system.

FIG. 1 is a block diagram of an example telecommunications system 100 including a telecommunications network 102. Generally, a telecommunications network includes a system of nodes connected by transmission links that enables the transfer of data between multiple users. Transmission links enable transmission of data (e.g., text, images, audio, or any form of data) between nodes. Examples of transmission links include wire links, fiber-optic cable links, radio wave links, and any other link that enables any kind of communication through electromagnetic waves. A node includes hardware, software, or both that implements methods for routing data between nodes (e.g., circuit switching, message switching, or packet switching) to enable the transmission of data to particular destinations (e.g., a user device connected to a node by a transmission link). Examples of telecommunications networks include local area networks (LANs), wide area networks (WANs), telephone networks, or a combination thereof.

The example telecommunications system 100 includes customer premises 104, e.g., CP1 106, CP2 108, and CP3 110, which could be, for example, residential or commercial premises. Users located at the customer premises 104 transmit and/or receive data over the network 102 using user devices such as telephones, televisions, computers, or any other appropriate device. Each of the customer premises includes an optical network terminal (ONT) that is connected to an optical line terminal (OLT) 112 by a fiber-optic cable link (e.g., the fiber-optic cable link 114). ONTs can perform operations including demultiplexing (i.e., separating) different components (e.g., television data, telephone voice data, and Internet data) of optical signals transmitted to customer premises over the network 102.

The OLT 112 can perform operations including converting data transmitted over the network 102 from an electrical signal (or any other kind of signal) to an optical signal and multiplexing (i.e., combining) different signal components for transmission over a fiber-optic cable link to the customer premises 104. Note that the telecommunications system 100 is described with reference to optical communications, but other communications methods can be used.

The network operations center 116 includes one or more locations from which a network operator (e.g., an Internet service provider) manages operation of the telecommunications system 100. Managing the operation of a telecommunications system includes performing different actions in the telecommunications system, e.g., by an artificial intelligence system as described in this specification.

The telecommunications system 100 includes a cloud environment 118 that provides remote access (e.g., over the Internet) to computing resources (e.g., memory and processing resources). The network operations center 116 may store and/or process data in the cloud environment 118.

The artificial intelligence system as described in this specification may be implemented using hardware and/or software components that are located in the cloud environment 118, the network operations center 116, the OLT 112, a combination thereof, or any other appropriate location.

Figure 2:
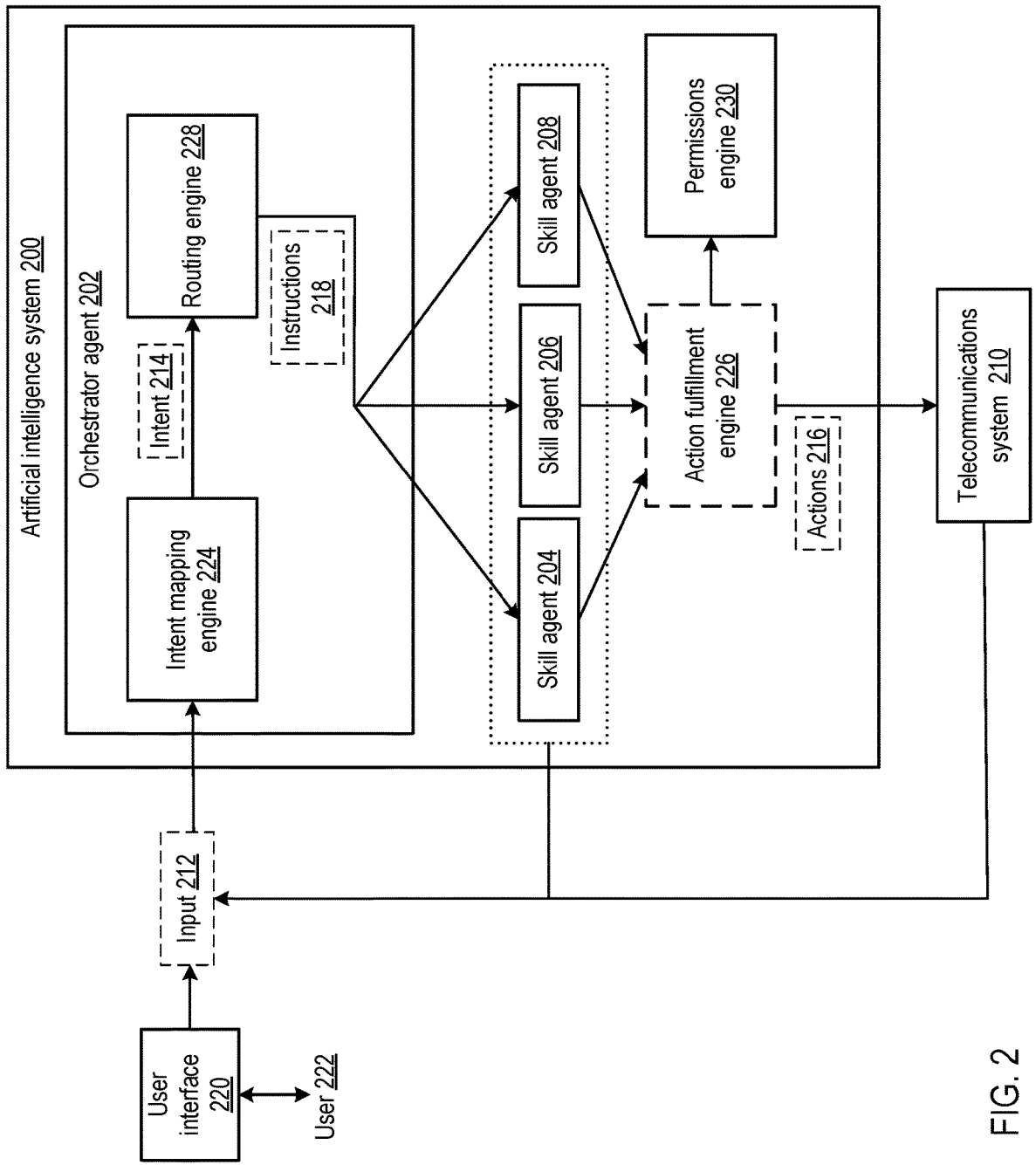
FIG. 2 is a block diagram of an example artificial intelligence system.

FIG. 2 shows an example artificial intelligence system 200. The artificial intelligence system 200 is an example of a system implemented as computer programs on one or more computers in one or more locations in which the systems, components, and techniques described below are implemented.

The artificial intelligence system 200 includes an orchestrator agent 202 and multiple skill agents (e.g., 204, 206, and 208). Each skill agent is specialized to perform specific actions in the telecommunications system 210 (e.g., troubleshooting the telecommunications system, providing information about the telecommunications system, optimizing traffic flow in the telecommunications system, predicting telecommunications system failures, or deploying hardware and/or software into the telecommunications system). In some cases, skill agents may be artificial intelligence agents (e.g., agents trained to perform actions using machine learning techniques). The orchestrator agent 202 receives an input 212, determines an intent 214 expressed by the input 212, identifies one or more skill agents that are trained to perform actions to fulfill the intent, and transmits instructions 218 to perform the actions to the appropriate skill agent. When they are capable of doing so, the skill agents can perform the actions 216 in a telecommunications system 210.

In some cases, the input 212 received by the orchestrator agent 202 is a user input that was input through a user interface 220 by a user 222 (e.g., a network operator). In some cases, the input 212 is an input received from a skill agent. In some cases, the input 212 is an input received directly from the telecommunications system 210 (e.g., remote sensor readings monitoring performance of the telecommunication system 210). The input 212 may be represented as numerical data, textual data, spoken data (e.g., representing a spoken utterance), video data, data defined by an application programming interface (API), or any combination thereof.

The user interface 220 may be any combination of hardware and/or software components that enables interaction between the user 222 and the system 200. For example, the user interface 220 may include a screen (e.g., a touchscreen), a microphone, a speaker, a keypad, a keyboard, or any combination thereof. The user interface 220 may be located remotely from the system 200 (i.e., in a different location) or may be located locally to the system 200 (i.e., in a same location). The user interface 220 may communicate with the system 200 (e.g., by transmitting the user input) by any appropriate means (e.g., over the Internet).

The orchestrator agent 202 provides the input 212 to an intent mapping engine 224 which is configured to process the input 212 to determine an intent 214 expressed by the input 212. The intent 214 expressed by the input 212 may be, for example, an intent to troubleshoot the telecommunication system 210 (e.g., by detecting and resolving problems affecting the telecommunications system 210), an intent to request information about the telecommunications system 210 (e.g., information indicating current performance measures of the telecommunications system 210), an intent to optimize traffic flow in the telecommunications system 210 (e.g., by rerouting traffic to avoid bottlenecks), an intent to predict telecommunications system failures (e.g., by predicting hardware component failures), or an intent to deploy hardware and/or software into the telecommunications system 210 (e.g., by updating telecommunications system software by integrating a software patch). The intent 214 can be represented in a numerical format (e.g., as a vector or as a matrix) or by any other appropriate means of representation. For example, the intent 214 can be expressed as a one-hot vector which has a different component for each of a predetermined number of possible intents. In this example, the component of the vector corresponding to the determined intent 214 may have value 1, while the other components of the vector (e.g., corresponding to other intents) have value 0.

As will be described further with reference to FIG. 3, the intent mapping engine 224 can determine the intent 214 by providing the input 212 (or a representation of the input 212) to an intent mapping neural network, which is configured to process the input 212 in accordance with current values of a set of intent mapping neural network parameters to generate an output including the intent 214. The values of the set of intent mapping neural network parameters may be determined (and adaptively updated) by reinforcement learning training procedures. When the input 212 is a natural language input (e.g., received from a user 222 by the user interface 220), the intent mapping engine may process the input 212 by natural language processing techniques to determine a numerical embedding of the input 212 prior to providing it to the intent mapping neural network.

The orchestrator agent 202 provides the intent 214 to a routing engine 228. The routing engine 228 is configured to identify, from among the multiple skill agents, one or more skill agents that have been trained to perform actions that fulfill the intent 214. In some implementations, the output of the intent mapping engine 224 includes data indicating one or more skill agents that have been trained to perform actions that fulfill the intent 214, and the routing engine 228 identifies the skill agents based on this output. In some implementations, the routing engine 228 identifies the skill agents based on a predetermined mapping from intents to particular skill agents that have been trained to perform actions that fulfill the intents.

The routing engine 228 transmits an instruction 218 to the identified skill agents to perform actions to fulfill the intent 214. The skill agents may be located remotely from the orchestrator agent 202 (i.e., in a different location) or may be located locally to the orchestrator agent 202 (i.e., in a same location). The orchestrator agent 202 may transmit the instruction 218 to the identified skill agents by any appropriate means (e.g., over the Internet by way of a wired or wireless connection). The instruction 218 may be represented in any appropriate format (e.g., in accordance with a given API, such as a RESTful API).

In some implementations, in response to receiving the instructions 218 to perform actions to fulfill the intent 214, each of the identified skill agents determine actions 216 to be performed in the telecommunications system 210 to fulfill the intent 214. In some other implementations, in response to receiving the instructions 218 to perform actions to fulfill the intent 214, each of the identified skill agents generates an output (e.g., a classification or regression output) that is transmitted to an action fulfillment engine 226. In these implementations, the action fulfillment engine 226 integrates and processes the outputs generated by the skill agents to determine the actions 216 to be performed to fulfill the intent 214. For example, in some situations, the action that will fulfill the intent 214 may require information from two or more different skill agents. In these situations, the information from each of the different skill agents can be collected and processed by the fulfillment engine 226, and the fulfillment engine 226 can then take an action in (e.g., make one or more changes to the operation or configuration of) the telecommunications system 210 to fulfill the intent.

In some implementations, the system 200 includes a permissions engine 230 that implements multi-tiered access control. More specifically, prior to the system 200 performing the actions 216 in the telecommunications system 210, the system 200 provides the actions 216 to a permissions engine 230. The permissions engine 230 determines whether each of multiple access control conditions are satisfied for the actions 216. If a multi-tiered access control condition is met (i.e., if each of the access control conditions are satisfied), then the system 200 performs the actions 216 in the telecommunications system 210. If the multi-tiered access control condition is not met (i.e., if one or more of the access control conditions are not satisfied), then the system 200 responds to the input 212 without performing the actions 216. By determining that the multi-tiered access control condition is met prior to performing the actions 216, the system 200 can ensure that both the user 222 and the identified skill agents have permission to perform the actions 216. Thereby, the system can, for example, prevent unauthorized users from accessing confidential data or prevent skill agents from performing actions that may disrupt the telecommunications system 210.

When the system 200 is not capable of carrying out the actions 216 (e.g., because of a hardware and/or software failure or because the multi-tiered access control condition is not met), the skill agents can respond to the orchestrator agent 202 with negative feedback (e.g., by transmitting a message to the orchestrator agent 202 indicating that the action cannot be performed).

Figure 3:
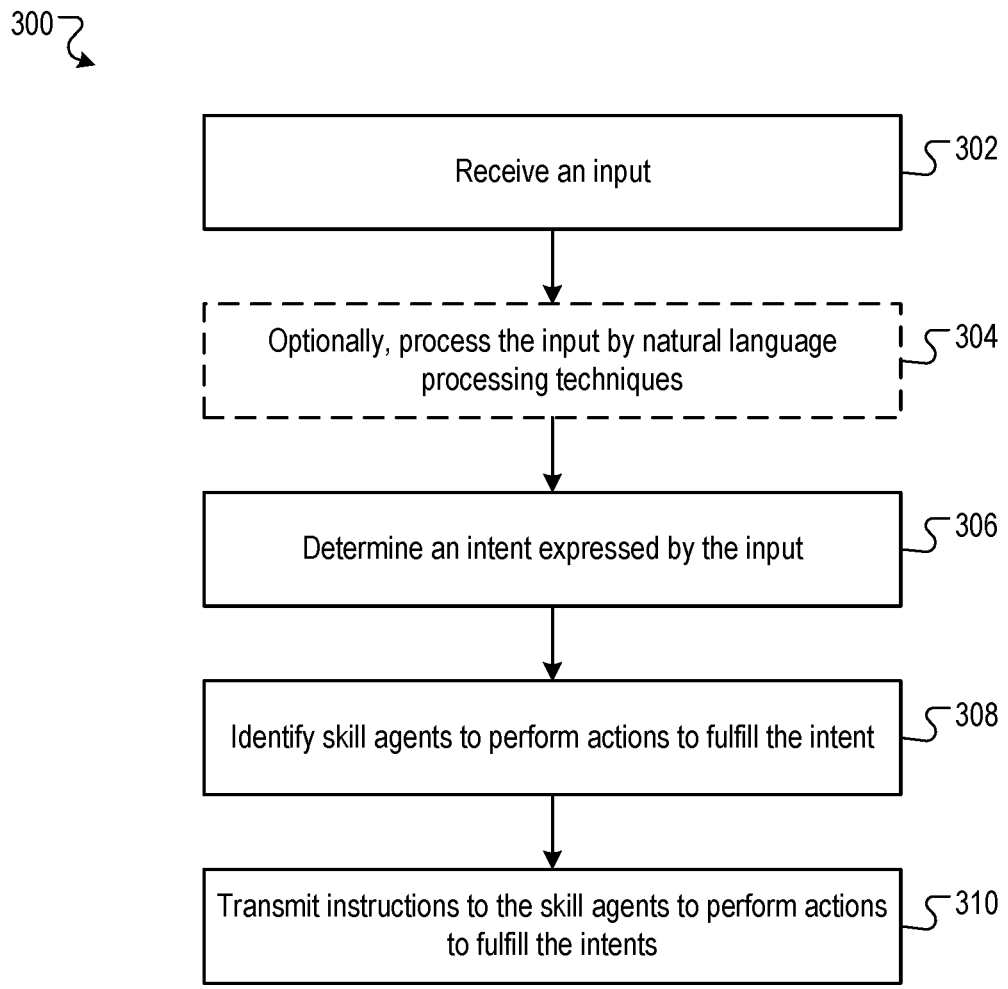
FIG. 3 is a flow diagram of an example process performed by an orchestrator agent in an artificial intelligence system.

FIG. 3 is a flow diagram of an example process performed by an orchestrator agent in an artificial intelligence system. For convenience, the process 300 will be described as being performed by an orchestrator agent including one or more computers located in one or more locations. For example, an orchestrator agent, e.g., the orchestrator agent 202 of FIG. 2, appropriately programmed in accordance with this specification, can perform the process 300.

The orchestrator agent receives an input (302). In some cases, the input is a user input that was input through a user interface by a user (e.g., a network operator). In some cases, the input is an input received from a skill agent (e.g., an input indicating that specified actions cannot be performed).

In some cases, the input is an input received directly from the telecommunications system (e.g., remote sensor readings monitoring performance of the telecommunication system). The input may be represented as numerical data, textual data, spoken data (e.g., representing a spoken utterance), video data, data defined by an API, or any combination thereof. For example, the input may be a natural language input from a user such as: "what is the average network data bandwidth currently being experienced by network users?". As another example, the input may be negative feedback data (e.g., defined by an API) from a skill agent indicating that the skill agent is not capable of carrying out an action (as described with reference to 412).

The user interface may be any combination of hardware and/or software components that enables interaction between the user and the orchestrator agent. For example, the user interface may include a screen (e.g., a touchscreen), a microphone, a speaker, a keypad, a keyboard, or any combination thereof. The user interface may be located remotely from the orchestrator agent (i.e., in a different location) or may be located locally to the orchestrator agent (i.e., in a same location). The user interface may communicate with the orchestrator agent (e.g., by transmitting the input) by any appropriate means (e.g., over the Internet).

If the input (e.g., as received in 302) is a natural language input (e.g., a sequence of written or spoken words), then the orchestrator agent can process the input by natural language processing techniques to determine a numerical representation of the input. For example, if the input is a textual input consisting of a sequence of words, then the orchestrator agent may map the textual input to a corresponding numerical representation by means of a natural language processing neural network (e.g., implemented as a feed-forward or recurrent neural network). More specifically, the natural language processing neural network may process the input in accordance with current values of a set of natural language processing neural network parameters to generate as output a numerical representation of the input. The orchestrator agent can adaptively train the natural language processing neural network (e.g., by adjusting a set of parameter values of the natural language processing neural network) by any appropriate training technique. As another example, if the input is a spoken input (i.e., a sequence of spoken utterances representing words), then the orchestrator agent may provide the input to a speech recognition neural network (e.g., implemented as a feed-forward or recurrent neural network). The speech recognition neural network may be configured to process the input in accordance with current values of a set of speech recognition neural network parameters to generate as output a textual transcription of the spoken input. The orchestrator agent can provide the textual transcription of the spoken input to a natural language processing neural network to generate a numerical representation of the input, as described previously.

The orchestrator agent determines an intent expressed by the input (306). The intent expressed by the input may be, for example, an intent to troubleshoot the telecommunication system (e.g., by detecting and resolving problems affecting the telecommunications system), an intent to request information about the telecommunications system (e.g., information indicating current performance measures of the telecommunications system), an intent to optimize traffic flow in the telecommunications system (e.g., by rerouting traffic to avoid bottlenecks), an intent to predict telecommunications system failures (e.g., by predicting hardware component failures), or an intent to deploy hardware and/or software into the telecommunications system (e.g., by updating telecommunications system software by integrating a software patch). The intent can be represented in a numerical format (e.g., as a vector or as a matrix) or by any other appropriate means of representation. For example, the intent can be expressed as a one-hot vector which has a different component for each of a predetermined number of possible intents. In this example, the component of the vector corresponding to the determined intent may have value 1, while the other components of the vector (e.g., corresponding to other intents) have value 0.

In some implementations, the orchestrator agent may determine the intent expressed by the input by providing the input (e.g., as obtained in 302), or a representation of the input (e.g., as determined in 304), to an intent mapping neural network. The intent mapping neural network may be configured to process the input (or a representation of the input) in accordance with current values of a set of intent mapping neural network parameters to generate an intent mapping output. In some cases, the intent mapping output includes a score for each of a predetermined number of possible intents, and the orchestrator agent selects the intent with the highest score. In some cases, the intent mapping output includes a score for each possible intent, the orchestrator agent processes the scores (e.g., using a soft-max function) to determine a probability distribution over the possible intents, and the orchestrator agent selects the intent by sampling from the probability distribution. In some implementations, the intent mapping output directly indicates a single intent, which is determined by the orchestrator agent to be the intent expressed by the input.

After determining the intent expressed by the input, the orchestrator agent may receive a reward (e.g., represented as a numerical value) based on progress towards results that respond to the input (e.g., progress that results from actions performed to fulfill the intent, as described with reference to FIG. 4). In some cases, the orchestrator agent may receive a higher reward based on greater progress towards results that respond to the input. For example, if the input is a request: "why is the network slow?", then the orchestrator agent may receive a higher reward for determining an intent indicating that telecommunications system troubleshooting should be performed than it would for determining an intent indicating that unrelated customer data should be retrieved. The rewards may be determined based on feedback received from a user. For example, the orchestrator agent may receive a reward based on the user indicating when progress is made towards results that respond to the user input. As another example, the orchestrator agent may receive a reward based on the user indicating a degree to which progress is made towards results that satisfactorily respond to the user input (e.g., on a scale from 1 to 10, or on a scale over any other appropriate range). In another example, the orchestrator may receive a reward when feedback is received (e.g., measurements from the telecommunications system) indicating that actions taken to fulfill the intent improved the operation of the telecommunications network. Generally, an intent having a higher level of rewards is indicative that the intent results in the system performing more optimal actions to fulfill the intent (e.g., as described with reference to FIG. 4) than another intent having a lower level of reward.

The orchestrator agent may train the intent mapping neural network based on the received rewards by reinforcement learning techniques. Specifically, the orchestrator agent may adjust the current values of the intent mapping neural network to cause the intent mapping neural network to generate intent mapping outputs that increase a measure of cumulative reward received by the orchestrator agent. For example, the measure of cumulative reward received by the orchestrator agent may be a long term time-discounted measure of cumulative reward, reflecting that rewards received sooner are more valuable to the orchestrator agent than rewards received later. By training the intent mapping neural network to generate intent mapping outputs that increase a measure of cumulative received reward, the orchestrator agent causes the intent mapping neural network to generate intent mapping outputs that result the system performing actions that more effectively respond to received inputs.

The orchestrator agent may train the intent mapping neural network using any appropriate reinforcement learning techniques, such as Q-learning techniques, policy gradient techniques, actor-critic techniques, or any other appropriate reinforcement learning technique. The intent mapping neural network may be implemented as a deep neural network (e.g., a feed-forward neural network or a recurrent neural network).

The orchestrator agent identifies, from among the multiple skill agents, one or more skill agents that have been trained to perform actions that fulfill the intent (i.e., as determined in 306) (308). In some implementations, the output of the intent mapping neural network includes data indicating skill agents that have been trained to perform actions that fulfill the intent, and the orchestrator agent identifies the skill agents based on this output. For example, the output of the intent mapping neural network may include numerical data that includes numerical indices corresponding to particular skill agents, and the orchestrator agent may identify the skill agents based on the numerical indices. In some other implementations, the orchestrator agent identifies the skill agents based on a predetermined mapping from intents to particular skill agents that have been trained to perform actions that fulfill the intents. For example, mapping data (i.e., indicating the mapping from intents to particular skill agents) may be stored in any appropriate format (e.g., in a logical data storage area or on a physical data storage device) and represented in any appropriate format (e.g., in a relational database format). The mapping data may include a representation of each intent and one or more corresponding skill agents that have been trained to perform actions that fulfill the intent. In this example, the orchestrator agent may identify the skill agents by accessing the mapping data and identifying skill agents corresponding to the intent based on the mapping data.

The orchestrator agent transmits instructions to the identified skill agents to perform actions that fulfill the intent (310). The instruction may be represented in any appropriate format (e.g., in accordance with a given API) and may be transmitted by any appropriate means (e.g., over the Internet).

Figure 4:
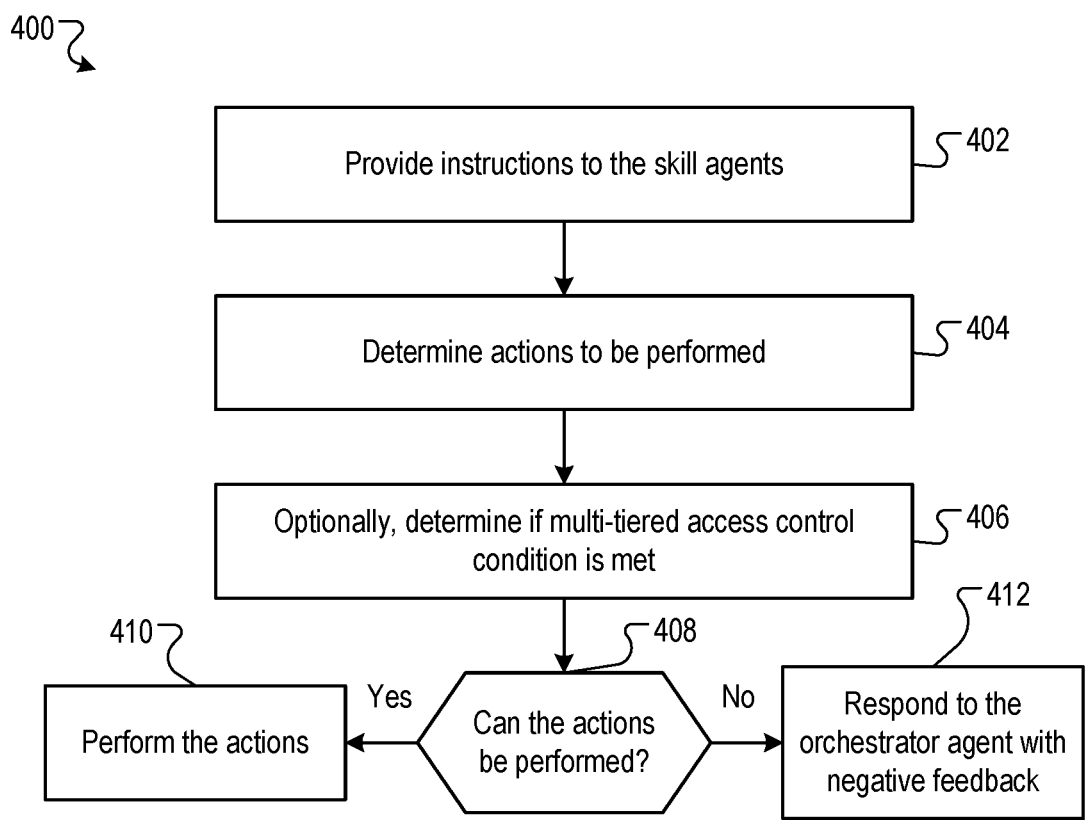
FIG. 4 is a flow diagram of an example process for an artificial intelligence system to perform actions in response to an input.

FIG. 4 is a flow diagram of an example process for an artificial intelligence system to perform actions in response to an input. For convenience, the process 400 will be described as being performed by a system of one or more computers located in one or more locations. For example, an artificial intelligence system, the artificial intelligence system 200 of FIG. 2, appropriately programmed in accordance with this specification, can perform the process 400.

The system provides instructions (by way of an orchestrator agent) to respective skill agents to perform actions to fulfill an intent expressed by an input to the system (402). The skill agents may be located remotely from the orchestrator agent (e.g., in a different location) or may be located locally to the orchestrator agent (e.g., in a same location). The system may transmit the instructions to the skill agents by any appropriate means (e.g., over the Internet). The instruction may be represented in any appropriate format (e.g., in accordance with a given API).

The system determines actions to be performed to fulfill the intent expressed by the input to the system (404). In some implementations, the skill agents process the received instructions to determine the actions to be performed. For example, a skill agent trained to perform telecommunications system troubleshooting operations may determine actions to be performed by harvesting data from the telecommunications system that characterizes the current operation of the telecommunications system. The skill agent may process the harvested data (e.g., by one or more machine learning models) to determine actions to be performed to resolve any problems affecting the network (e.g., rerouting telecommunications network traffic to avoid a bottleneck and thereby increase network bandwidth). In some other implementations, the skill agents may process the received instructions to generate skill agent outputs (e.g., classification or regression outputs) and transmit the skill agent outputs to, for example, the action fulfillment engine 226. The action fulfillment engine may integrate the skill agent outputs to determine the actions to be performed. For example, a skill agent configured to perform troubleshooting operations may generate a skill agent output that indicates a problem that may be affecting the telecommunications system. In this example, the action fulfillment engine 226 may determine an action to be performed by mapping the skill agent output indicating a problem that may be affecting the network to a corresponding action to resolve the problem.

Examples of actions include troubleshooting the telecommunications system (e.g., detecting and resolving problems affecting the telecommunications system), providing information about the telecommunications system (e.g., providing information indicating current performance measures of the telecommunications system), optimizing traffic flow in the telecommunications system (e.g., by rerouting traffic to avoid bottlenecks), predicting telecommunications system failures (e.g., hardware failures), and deploying hardware and/or software into the telecommunications system (e.g., updating telecommunications system software by integrating a software patch)

Optionally, the system determines whether a multi-tiered access control condition is met (406). Specifically, prior to performing the determined actions (e.g., as described with reference to 404), the system determines whether each of multiple access control conditions are satisfied. Determining whether the multi-tiered access control condition is met may include determining whether a user (e.g., network operator) that submitted the input has permission to access the skill agent which determined the actions to be performed and/or determining whether the skill agents have permission to access data required to perform the actions. For example, permission to access skill agents that perform actions that could disrupt the telecommunications system may be restricted to a limited number of users. As another example, permission to access confidential data (e.g., relating to customer financial information) may be restricted to a limited number of skill agents.

Determining whether the multi-tiered access control condition is met may include accessing permission data stored in any appropriate format (e.g., in a logical data storage area or on a physical data storage device) and represented in any appropriate format (e.g., in a relational database format). The permission data may include identifiers (e.g., represented in an alpha-numeric format) of users and/or skill agents, and corresponding permissions provided to the users and/or skill agents. For example, a user may be provided with permissions to access particular skill agents, or a skill agent may be provided with permissions to access particular subsets of data. Determining whether the user that submitted the input has permission to access the identified skill agent may include: obtaining the user's identifier (e.g., through the user interface), accessing the permission data, and determining whether the access to the identified skill agent is included in the permissions provided to the user based on the permissions associated with the user's identifier. Similarly, determining whether the identified skill agent has permission to access data required to perform the action may include: obtaining the skill agent's identifier, accessing the permission data, and determining whether the access to the data is included in the permissions provided to the skill agent based on the permissions associated with the skill agent's identifier The system determines whether the actions (e.g., as determined in 404) can be performed (408). In some cases, the system may determine that the actions cannot be performed because the skill agents are not capable of carrying out the actions (e.g., because of a hardware and/or software failures). In some cases, the system may determine the actions cannot be performed because the multi-tiered access control condition (as described with reference to 406) is not met.

In response to determining that the actions can be performed, the system performs the actions (410). In some implementations, the skill agents perform the actions. In some implementations, the action fulfillment engine 226 performs the actions.

In response to determining that the actions cannot be performed, the skill agents and/or the action fulfillment engine 226 respond to the orchestrator agent with negative feedback (e.g., by transmitting a message to the orchestrator agent indicating that the actions cannot be performed). In some cases, the skill agents determine new actions to be performed that fulfill the intent expressed by the input to the system but that are different than the actions determined in 404. After determining the new actions to be performed, the system returns to 406 and repeats the preceding steps. By determining new actions to be performed, the system can recover from being unable to perform certain actions and still go on to fulfill the intent expressed by the system input.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An artificial intelligence system, comprising:
a plurality of artificial intelligence skill agents, including one or more processors, that have each been trained to perform different actions in a telecommunications system; and
an orchestrator agent that interacts with each of the plurality of artificial intelligence skill agents and coordinates which of the plurality of artificial intelligence agents performs actions in response to user input, wherein the orchestrator agent includes one or more processors and a non-transitory computer readable medium storing instructions that upon execution cause the orchestrator agent to perform operations comprising:
receiving a user interface input that was input through a user interface;
determining an intent expressed by the user interface input, comprising:
processing an input derived from the user interface input using an intent mapping neural network, in accordance with a plurality of intent mapping neural network parameters, to generate an intent mapping output; and
selecting the intent, from a set of intents, based on the intent mapping output of the intent mapping neural network, wherein the set of intents comprises: an intent to troubleshoot the telecommunications system, an intent to optimize traffic flow in the telecommunications system, or both;
identifying, from among the plurality of artificial intelligence skills agents, a given artificial intelligence skill agent that has been trained to perform an action that provides a response to the intent expressed by the user interface input; and
transmitting an instruction to the given artificial intelligence skill agent to perform the action in the telecommunications system;
wherein, in response to receiving the instruction from the orchestrator agent to perform the action in the telecommunication system, the given artificial intelligence skill agent processes the instruction to perform the action in the telecommunications system, including:
performing the action when the given artificial intelligence skill agent is capable of carrying out the action; and
responding to the orchestrator agent with negative feedback when the given artificial intelligence skill agent is incapable of carrying out the action;
wherein the non-transitory computer readable medium of the orchestrator agent stores further instructions that, upon execution, cause the orchestrator agent to perform further operations comprising:
identifying that the intent expressed in the user interface input is an intent to troubleshoot the telecommunications system or an intent to optimize traffic flow in the telecommunications system;
obtaining one or more measurements characterizing a state of the telecommunications system after the given artificial intelligence skill agent processes the instruction to perform the action in the telecommunications system;
determining a reward based at least in part on the measurements characterizing the state of the telecommunications system, wherein the reward characterizes progress, achieved by the given artificial intelligence skill agent by processing the instruction to perform the action in the telecommunications system, towards results that improve operation of the telecommunications network by fulfilling the intent expressed by the user interface input; and
training the intent mapping neural network based on the reward using reinforcement learning techniques.

2. The system of claim 1, wherein training the intent mapping neural network comprises adjusting current values of the intent mapping neural network parameters.

3. The system of claim 1, wherein determining an intent expressed by the user interface input comprises processing the user interface input using natural language processing techniques.

4. The system of claim 1, wherein when the given artificial intelligence skill agent is incapable of carrying out the action, the given artificial intelligence skill agent performs operations comprising:
 determining a new action that provides a response to the intent expressed by the user interface input, wherein the new action is different than the action;
 performing the new action when the given artificial intelligence skill agent is capable of carrying out the new action.

5. The system of claim 1, wherein the artificial intelligence system performs operations comprising determining whether a multi-tiered access control condition has been met prior to the given artificial intelligence skill agent performing the action, including:
 determining whether a network operator that submitted the user input has permission to access the given artificial intelligence skill agent; and
 determining whether the given artificial intelligence skill agent has permission to access data required to perform the action.

6. The system of claim 5, wherein the given artificial intelligence skill agent performing the action is conditioned on the multi-tiered access control condition being met.

7. The system of claim 6, wherein in response to the determination of whether the multi-tiered access control condition has been met:
 the given artificial intelligence skill agent performs the action when the multi-tiered access control condition has been met; and
 the artificial intelligence system responds to the user input without the given artificial intelligence skill agent performing the action when the multi-tiered access control condition has not been met.

8. The system of claim 1, wherein determining the reward that characterizes progress towards results that fulfill the intent expressed by the user interface input comprises:
 determining a higher reward for greater progress towards results that fulfill the intent expressed by the user interface input.

9. The system of claim 1, wherein the set of intents further comprises an intent to predict telecommunications system failures.

10. The system of claim 1, wherein the set of intents further comprises an intent to deploy software into the telecommunications system.

11. A computer-implemented method comprising:
 performing, by an orchestrator agent that interacts with each of a plurality of artificial intelligence skill agents and coordinates which of the plurality of artificial intelligence agents performs actions in a telecommunications system in response to user inputs, operations comprising:
  receiving a user interface input that was input through a user interface;
  determining an intent expressed by the user interface input, comprising:
   processing an input derived from the user interface input using an intent mapping neural network, in accordance with a plurality of intent mapping neural network parameters, to generate an intent mapping output; and
   selecting the intent, from a set of intents, based on the intent mapping output of the intent mapping neural network, wherein the set of intents comprises: an intent to troubleshoot the telecommunications system, an intent to optimize traffic flow in the telecommunications system, or both;
  identifying, from among a plurality of artificial intelligence skills agents, a given artificial intelligence skill agent that has been trained to perform an action that provides a response to the intent expressed by the user interface input, wherein each of the plurality of artificial intelligence skill agents have been trained to perform different actions in the telecommunications system;
  transmitting an instruction to the given artificial intelligence skill agent to perform the action in the telecommunications system; and
 performing, by the given artificial intelligence skill agent, and in response to receiving the instruction from the orchestrator agent to perform the action in the telecommunication system, operations comprising:
  performing the action when the given artificial intelligence skill agent is capable of carrying out the action; and
  responding to the orchestrator agent with negative feedback when the given artificial intelligence skill agent is incapable of carrying out the action;
 identifying that the intent expressed in the user interface input is an intent to troubleshoot the telecommunications system or an intent to optimize traffic flow in the telecommunications system;
 obtaining one or more measurements characterizing a state of the telecommunications system after the given artificial intelligence skill agent processes the instruction to perform the action in the telecommunications system;
 determining a reward based at least in part on the measurements characterizing the state of the telecommunications system, wherein the reward characterizes progress, achieved by the given artificial intelligence skill agent by processing the instruction to perform the action in the telecommunications system, towards results that improve operation of the telecommunications network by fulfilling the intent expressed by the user interface input; and
 training the intent mapping neural network based on the reward using reinforcement learning techniques.

12. The method of claim 11, wherein:
 training the intent mapping neural network comprises adjusting current values of the intent mapping neural network parameters.

13. The method of claim 11, wherein determining an intent expressed by the user interface input comprises processing the user interface input using natural language processing techniques.

14. The method of claim 11, wherein when the given artificial intelligence skill agent is incapable of carrying out the action, the given artificial intelligence skill agent performs operations comprising:
 determining a new action that provides a response to the intent expressed by the user interface input, wherein the new action is different than the action;
 performing the new action when the given artificial intelligence skill agent is capable of carrying out the new action.

15. The method of claim 11, further comprising determining whether a multi-tiered access control condition has been met prior to the given artificial intelligence skill agent performing the action, including:

determining whether a network operator that submitted the user input has permission to access the given artificial intelligence skill agent; and determining whether the given artificial intelligence skill agent has permission to access data required to perform the action.

16. The method of claim 15, wherein the given artificial intelligence skill agent performing the action is conditioned on the multi-tiered access control condition being met.

17. The method of claim 16, further comprising:
in response to the determination of whether the multi-tiered access control condition has been met:
performing the action, by the given artificial intelligence skill agent, when the multi-tiered access control condition has been met; and
responding to the user input without the given artificial intelligence skill agent performing the action when the multi-tiered access control condition has not been met.

18. A non-transitory computer storage medium storing instructions executable by a data processing apparatus, including one or more processors, and that upon such execution cause the data processing apparatus to perform operations comprising:
performing, by an orchestrator agent, including one or more processors, that interacts with each of a plurality of artificial intelligence skill agents, including one or more processors, and coordinates which of the plurality of artificial intelligence agents performs actions in a telecommunications system in response to user inputs, operations comprising:
receiving a user interface input that was input through a user interface;
determining an intent expressed by the user interface input, comprising:
processing an input derived from the user interface input using an intent mapping neural network, in accordance with a plurality of intent mapping neural network parameters, to generate an intent mapping output; and
selecting the intent, from a set of intents, based on the intent mapping output of the intent mapping neural network, wherein the set of intents comprises: an intent to troubleshoot the telecommunications system, an intent to optimize traffic flow in the telecommunications system, or both;
identifying, from among a plurality of artificial intelligence skills agents, a given artificial intelligence skill agent that has been trained to perform an action that provides a response to the intent expressed by the user interface input, wherein each of the plurality of artificial intelligence skill agents have been trained to perform different actions in the telecommunications system;
transmitting an instruction to the given artificial intelligence skill agent to perform the action in the telecommunications system; and
performing, by the given artificial intelligence skill agent, and in response to receiving the instruction from the orchestrator agent to perform the action in the telecommunication system, operations comprising:
performing the action when the given artificial intelligence skill agent is capable of carrying out the action; and
responding to the orchestrator agent with negative feedback when the given artificial intelligence skill agent is incapable of carrying out the action;
identifying that the intent expressed in the user interface input is an intent to troubleshoot the telecommunications system or an intent to optimize traffic flow in the telecommunications system;
obtaining one or more measurements characterizing a state of the telecommunications system after the given artificial intelligence skill agent processes the instruction to perform the action in the telecommunications system;
determining a reward based at least in part on the measurements characterizing the state of the telecommunications system, wherein the reward characterizes progress, achieved by the given artificial intelligence skill agent by processing the instruction to perform the action in the telecommunications system, towards results that improve operation of the telecommunications network by fulfilling the intent expressed by the user interface input; and
training the intent mapping neural network based on the reward using reinforcement learning techniques.

19. The non-transitory computer storage medium of claim 18, wherein:
training the intent mapping neural network comprises adjusting current values of the intent mapping neural network parameters.

20. The non-transitory computer storage medium of claim 18, wherein determining an intent expressed by the user interface input comprises processing the user interface input using natural language processing techniques.

* * * * *